United States Patent
Vasudeva et al.

(10) Patent No.: US 9,488,263 B2
(45) Date of Patent: Nov. 8, 2016

(54) MODULAR ARRANGEMENT FOR HYDROMECHANICAL TRANSMISSION

(71) Applicant: Caterpillar Inc., Peoria, IL (US)

(72) Inventors: Gaurav Vasudeva, Peoria, IL (US); Michael G. Cronin, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 49 days.

(21) Appl. No.: 14/461,160

(22) Filed: Aug. 15, 2014

(65) Prior Publication Data

US 2016/0047449 A1 Feb. 18, 2016

(51) Int. Cl.
*F16H 47/02* (2006.01)
*F16H 47/04* (2006.01)
*F16H 37/08* (2006.01)

(52) U.S. Cl.
CPC ....... *F16H 47/04* (2013.01); *F16H 2037/0886* (2013.01)

(58) Field of Classification Search
CPC ... F16H 47/04; F16H 47/02; F16H 2047/045
USPC ........................................ 475/73, 80, 31, 83
See application file for complete search history.

(56) References Cited

U.S. PATENT DOCUMENTS

| | | | |
|---|---|---|---|
| 3,916,729 A | 11/1975 | Herr | |
| 5,156,577 A * | 10/1992 | Fredriksen | F16H 47/04 475/74 |
| 5,980,411 A * | 11/1999 | Wontner | F16H 47/04 475/76 |
| 6,105,710 A | 8/2000 | Vandepitte | |
| 6,986,726 B2 | 1/2006 | Simon | |
| 7,131,929 B2 | 11/2006 | Körner et al. | |
| 7,465,245 B2 * | 12/2008 | Ripamonti | F16H 47/04 475/72 |
| 7,530,913 B2 | 5/2009 | Fabry et al. | |
| 7,530,914 B2 | 5/2009 | Fabry et al. | |
| 8,452,500 B1 * | 5/2013 | Seipold | F16H 47/04 475/204 |
| 8,747,269 B2 | 6/2014 | Mattsson et al. | |
| 8,784,257 B2 | 7/2014 | Mattsson et al. | |
| 2006/0276291 A1 | 12/2006 | Fabry et al. | |
| 2010/0107812 A1 | 5/2010 | Otten et al. | |
| 2010/0151984 A1 | 6/2010 | Viitasalo et al. | |
| 2011/0015022 A1 | 1/2011 | Stoeckl et al. | |
| 2013/0109522 A1 * | 5/2013 | Calvert | F16H 47/04 475/1 |
| 2013/0226416 A1 | 8/2013 | Seipold et al. | |
| 2013/0281244 A1 | 10/2013 | Vaughn | |

FOREIGN PATENT DOCUMENTS

| | | |
|---|---|---|
| CN | 202165552 U | 3/2012 |
| GB | 667205 A | 2/1952 |
| WO | 2013130427 | 9/2013 |

* cited by examiner

*Primary Examiner* — Jacob S Scott
*Assistant Examiner* — Tinh Dang
(74) *Attorney, Agent, or Firm* — Caterpillar Inc.; James Bennin

(57) ABSTRACT

Transmission for coupling to hydromechanical power source includes differential and range modules including planetary gear arrangements, a plurality of selectively engageable clutch assemblies, and a drop box module, which includes a final output member. First and second power source paths provide power to the differential module. The clutch assemblies are selectively engageable to provide variable rotational power from the differential module to the range module, and from the range module to the drop box module in a plurality of directional ranges. The drop box adapts the variable rotational power provided in the selected range for connection in a given application.

18 Claims, 6 Drawing Sheets

MODULAR ARRANGEMENT FOR HYDROMECHANICAL TRANSMISSION

TECHNICAL FIELD

This disclosure relates generally to continuously variable transmissions and more particularly to a modular gear arrangement and method of coupling gears in a hydromechanical transmission.

BACKGROUND

Multi-range hydromechanical transmissions are well known. Ranges are changed by sequentially disengaging and engaging a number of synchronizers and clutch assemblies. Split torque continuously variable transmissions (CVT) may utilize automated dual clutch arrangements in conjunction with a plurality of synchronizers. Existing continuously variable transmissions are large, quite long structures in order to meet machine use and drop requirements. Existing continuously variable transmissions typically are not economically incorporated into smaller applications, providing undesirably low returns on investment. Thus, such transmissions generally are utilized in only limited smaller applications. Moreover, dedicated components and subassemblies are generally required for different machine platforms. U.S. Pat. No. 7,131,929 to Körner, et al., discloses a transmission system including a mechanical power-transmitting element with a mechanical transmission part arranged in a housing.

SUMMARY

The disclosure describes, in one aspect, a transmission for coupling to hydromechanical power source having a first power source path including a variator and a second power source path including at least one mechanical gear. The transmission includes a plurality of selectively engagable clutch assemblies, a differential module, a range module, and a drop box module. The differential module includes at least one first planetary gear arrangement. The first and second power source paths provide power to the differential module. The range module includes at least one second planetary gear arrangement. The plurality of clutch assemblies is selectively engagable to provide a plurality of directional ranges. At least a first of the clutch assemblies is being selectively engagable to couple at least one gear from the first planetary gear arrangement of the differential module with at least one gear from the second planetary gear arrangement. At least a second of the clutch assemblies is selectively engagable to couple with at least one gear from the second planetary gear arrangement. The drop box module includes a final output member. The differential module is coupleable to the range module to provide a variable rotational power to the range module. The range module is coupleable to the drop box module to direct the variable rotational power in a selected direction. The drop box adapts the variable rotational power provided in the selected direction to a final output member.

BRIEF DESCRIPTION OF THE DRAWING(S)

The accompanying drawings, which are incorporated in and constitute a part of this specification, illustrate exemplary embodiments of the disclosure and, together with the description, serve to explain the principles of the disclosure. In the drawings, FIG. 1 illustrates a schematic view of a hydromechanical transmission.

DETAILED DESCRIPTION

This disclosure relates to a method of synchronizing in a split torque arrangement in a continuously variable transmission. The method has universal applicability to any machine utilizing such an arrangement. For example, the term "machine" may refer to any machine that performs some type of operation associated with an industry such as, for example, mining, construction, farming, transportation, or any other industry known in the art. By way of example only, the machine may be a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other paving or underground mining equipment. Moreover, one or more implements may be connected to the machine and driven from the transmission.

Figure 1:
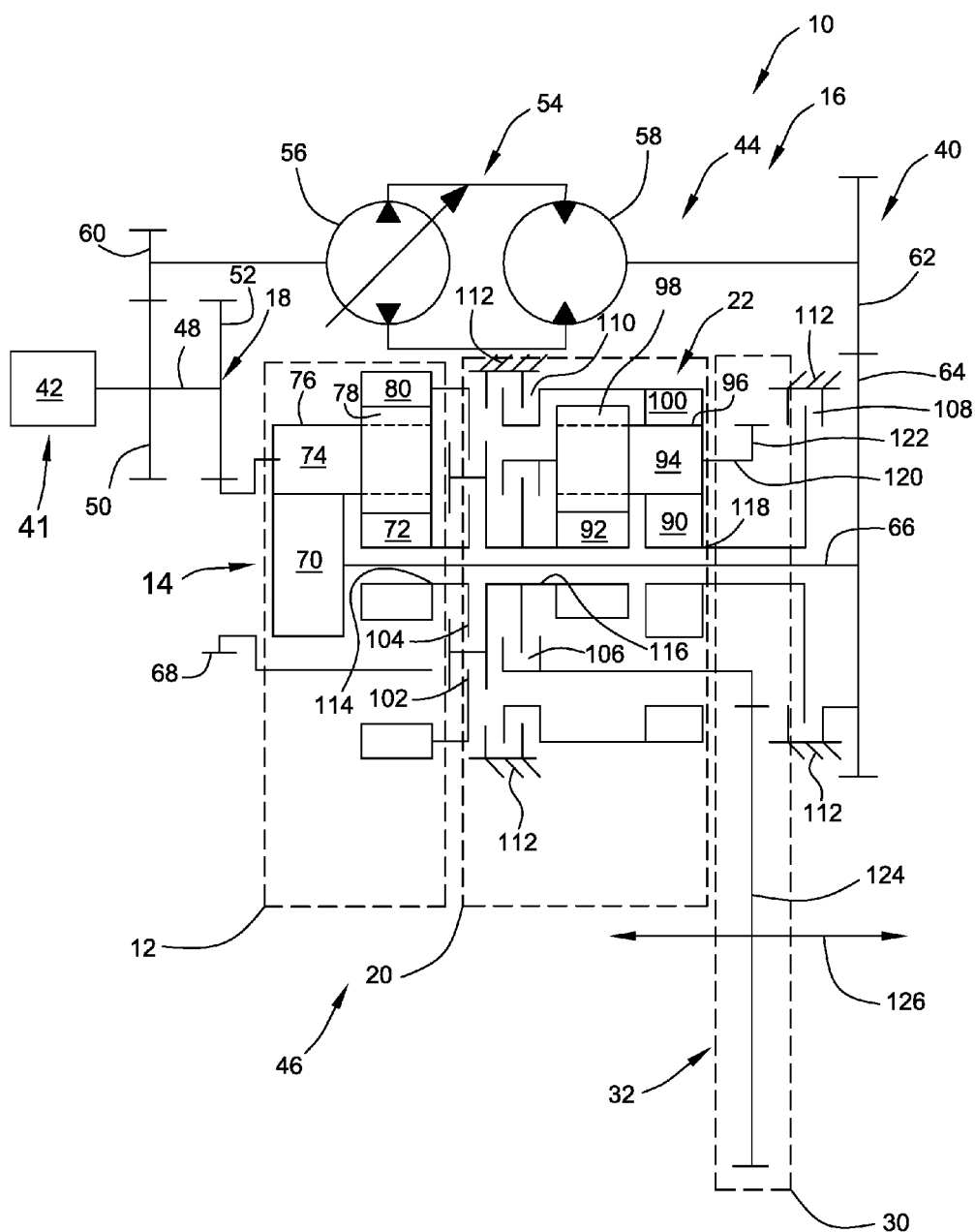

Referring to FIG. 1, there is illustrated a schematic view of an exemplary continuously variable transmission 10 incorporating aspects of this disclosure. While a specific embodiment of a continuously variable transmission 10 is described herein, the continuously variable transmission may be of any type having appropriate components for performance of the method disclosed herein. According to an aspect of the disclosure, the transmission 10 includes a plurality of modules that may be coupled together in varied output configurations for application to a plurality of machine applications. For ease of understanding, broken lines are provided about the respective modules. The first, differential module 12 includes at least one first planetary gear arrangement 14 with a plurality of gears, and determines the torque/speed reduction from an input that combines first and second power source paths 16, 18, as will be discussed in greater detail below. The second, range module 20 includes a second planetary gear arrangement 22 with a plurality of gears. A plurality of selectively engagable clutch assemblies 102, 104, 106, 108, 110 are also provided. For the purposes of this disclosure, the term "selectively engagable" means that the clutch assembly may be engaged or disengaged, depending upon a selected mode of operation. At least one of the clutch assemblies is disposed to selectively engage at least one of the gears from the first planetary gear arrangement 14 with at least one gear from the second planetary gear arrangement 22. At least another one of the clutch assemblies is selectively engagable with at least one of the gears of the second planetary gear arrangement 22. The first, differential module 12 determines the torque/speed reduction from an input that combines first and second power source paths 16, 18, as will be discussed in greater detail below. The second, range module 20 determines the direction of motion transmitted by the transmission, that is, whether the transmission 10 is in forward, reverse, or auxiliary. Finally, the third, drop box module 30 includes an output gearing arrangement 32 and adapts the output of the differential module 12 and the range module 20 to a final output member 126 for specific machine configurations.

The illustrated continuously variable transmission 10 is a hydromechanical transmission 40, which is driven by a primary driver 41, for example, an engine 42. The engine 42 may be, for example, an internal combustion engine, although the engine 42 may be any kind of device capable of powering the continuously variable transmission 10 as described herein.

The engine 42 outputs to both a hydrostatic transmission 44 and a mechanical transmission 46 through an input member 48. The input member 48 provides split power to the hydrostatic transmission 44 and the first planetary gear arrangement 14 of the mechanical transmission 46 through first and second fixed input gears 50, 52, respectively. For the purposes of this application, the term "fixed" may be understood as being integral with, permanently attached, pinned, interconnected through a splined connection, or fused by welding, for example, or by any other means known to those having ordinary skill in the art.

The hydrostatic transmission 44 includes a variator 54 that includes a variable displacement pump 56 and a motor 58, which is operated by the pump 56. The variable displacement pump 56 is drivingly connected to the engine 42, through a hydrostatic transmission input gear 60 engaged with the first fixed input gear 50. The motor 58 may be variable displacement or fixed displacement. The motor 58 outputs through a hydrostatic transmission output gear 62 engaged with a second planetary input member 64 to the first planetary gear arrangement 14 by way of connection member 66. Thus, the pump 56 of the hydrostatic transmission 44 uses the split input power from the engine 42 to fluidly drive the motor 58 to convert the input power from the engine 42 to hydrostatic output power over a continuously variable speed ratio. The transmission of power through the input member 48, the first fixed input gear 50, the hydrostatic transmission input gear 60, the variator 54, and the hydrostatic transmission output gear 62 as a first power source path 16.

The hydromechanical transmission 40 includes the second fixed input gear 52 coupled to the input member 48. The second fixed input gear 52 engages connection member 68, which provides input to the first planetary gear arrangement 14. In the illustrated embodiment, the connection member 68 is a gear. The transmission of power through the mechanical coupling of the input member 48, the second fixed input gear 52 to connection member 68 may be described as a second power source path 18. While particular first and second power source paths 16, 18 have been illustrated, the first and second power source paths 16, 18 may be other than as illustrated, and will be, at least in part, dependent upon the machine including the continuously variable transmission 10.

According to a feature of the modular arrangement, the first planetary gear arrangement 14 may be a so-called Ravigneaux planetary gear set. That is, the planetary gear arrangement 14 may include two sun gears 70, 72, a single planet carrier 74 holding an first and second planetary gear sets 76, 78, generally an inner planets and outer planets, and a ring gear 80. The first planetary gear arrangement 14 combines the hydrostatic output power from the first power source path 16 to second planetary input member 64 with the split input mechanical power from second power source path 18 by way of the second fixed input gear 52 to provide hydromechanical output power to the second, range module 20. In other words, the first planetary gear arrangement 14 provides a choice of planetary outputs to provide a desired speed to the second, range module 20.

The second planetary gear arrangement 22 may likewise include a so-called Ravigneaux planetary gear set. More specifically, second planetary gear arrangement 22 may include two sun gears 90, 92, a single planet carrier 94 holding an first and second planetary gear sets 96, 98, generally an inner planets and outer planets, and a ring gear 100. While the first and second planetary gear arrangements 14, 22 have been illustrated in a particular configuration, they may be other than as illustrated.

Also provided is a plurality of clutch assemblies 102, 104, 106, 108, 110. As will be understood by those of skill in the art, the clutch assemblies 102, 104, 106 include respective rotatable discs that may be selectively coupled to other rotatably mounted discs to further transmit power from one rotatable member to another. In contrast, clutch assemblies 108, 110 include respective rotatable discs that may be selectively coupled to a stationary member 112, such as a housing. Accordingly, 108, 110 are stationary clutch assemblies 108, 110, also known as brakes, which hold the speed of a coupled gear (ring gear 100 and planet carrier 94, respectively) to zero, thereby affecting the speed and/or direction of the output from the second planetary gear arrangement 22.

At least a first one of the clutch assemblies 102, 104 may be selectively engaged to couple the first planetary gear arrangement 14 with the second planetary gear arrangement 22. In this way, the engagement of at least one gear of the first planetary gear arrangement 14 with at least one gear of the second planetary gear arrangement 22 determines the torque/speed reduction from an input that combines first and second power source paths 16, 18, as will be discussed in greater detail below. In this embodiment, engagement of clutch assembly 102 provide a low gear range, while engagement of clutch assembly 104 provides a high gear range.

Similarly, at least a second one of the clutch assemblies 108, 110 may be selectively engaged to couple with the second planetary gear arrangement 22 to determine the direction of power output from the second, range module 20 to the third, drop box module 30. In the illustrated embodiment, the clutch assemblies 108, 110 are stationary clutches, that is, brakes. In this embodiment, engagement of the clutch assembly 108 ultimately provides a forward gear range, while engagement of the clutch assembly 110 provides a reverse gear range. Conversely, the at least a second one of the clutch assemblies 106 may be selectively engaged to couple respective gears of the second planetary gear arrangement 22 with first planetary gear arrangement 14. In the embodiment illustrated, such engagement of clutch assembly 106 provides an auxiliary gear range. Likewise, in accordance with this disclosure, engagement of alternate clutch assemblies of the transmission may be adapted to provide a variety of ranges.

While the clutch assemblies have been illustrated in a particular configuration, it will be appreciated that an alternate arrangement of clutch assemblies may be provided, including a greater or lesser number of clutches, alternate positioning, and with coupling to alternate gears, so long as the clutch assemblies may be engaged and/or disengaged in order to provide a selection of ranges. Moreover, one or more of the clutch assemblies may be part of the second, range module 20, such as illustrated in FIG. 1, or part of the first, differential module 12. For example, clutches 102, 104 may be packaged in conjunction with the first planetary gear arrangement 14; clutch assemblies 106, 110 may be packaged in conjunction with the second planetary gear arrangement 22; and the clutch assembly 108 may be disposed separate from the remaining clutch assemblies 102, 104, 106, 110.

Some components of the first planetary gear arrangement 14, the second planetary gear arrangement 22 and components of the plurality of clutch assemblies 102, 104, 106, 108, 110 may be rotatably mounted about the connection member 66 by plurality of rotatable sleeves or hubs 114, 116, 118. For example, the sun gear 72 as well as the rotatable disc(s) of the clutch assembly 104 may be coupled for rotation with hub 114. Similarly, sun gear 92 and rotatable discs of the clutch assemblies 102, 106 may be coupled for rotation with hub 116, while sun gear 90, ring gear 100, and rotatable discs of clutch assemblies 108, 110 may be coupled for rotation with hub 118. According to an aspect of this disclosure, the clutch assemblies 102, 104, 106, 108, 110 may be selectively engaged or disengaged in order to provide a desired range to an output member 120 of the second planetary gear arrangement 22 to the third, drop box module 30. In this embodiment, the output member 120 is coupled for rotation with planet carrier 94, although the output member 120 may be alternately coupled.

The third, drop box module 30 includes the output gearing arrangement 32. The output gearing arrangement 32 may be designed to adapt the output provided by the output member 120 to a particular application. In the illustrated embodiment, the output member 120 provides rotation to a first output gear 122 engagingly coupled to a final output gear 124 to provide rotation to a final output member 126. It will be appreciated, however, that the third, drop box module 30 may be alternately designed to facilitate adaptation of the output of the second, range module 20 for specific applications. For example, fewer or additional structure may be provided, the sizes, number, configuration and gear ratios of output gears may be varied.

In the illustrated embodiment, the input member 48, connection member 66, the hubs 114, 116, 118, are positioned parallel to the planetary gear arrangements 14, 22, output member 120 and the final output member 126. As is customary, one or more of the input member 48, output member 120, connection member 66, and the final output member 126 as well as other components may be supported within a transmission housing (not shown) and rotate about bearings, or the like, (not shown) held within the housing.

While third, drop box module 30 is illustrated, the positions, engagements, and components of the third, drop box module 30 as well as the position and arrangement of the final output member 126 to a machine may be other than as illustrated, and will be, at least in part, dependent upon the machine itself.

INDUSTRIAL APPLICABILITY

Turning now to the operation of each of the first, differential module 12, power is delivered from the primary driver 41 to first planetary gear arrangement 14 by way of the first and second power source paths 16, 18. More specifically, rotation of input member 48 provides power through the first fixed input gear 50 and the hydrostatic transmission input gear to the variator 54. The variator 54 provides power through the hydrostatic transmission output gear 62 to the second planetary input member 64, which is fixedly connected to connection member 66, which is likewise coupled to sun gear 70 of the first planetary gear arrangement 14. Rotation of the input member 48 by the primary driver 41 likewise provides power through the second fixed input gear 50 and connection member 68 to the planet carrier 74 of the first planetary gear arrangement 14.

Power from the first, differential module 12 is transmitted to the second planetary gear arrangement 22 based upon selective engagement or disengagement of the clutch assemblies 102, 104, 106, 108, 110 to provide varied ranges. More specifically, in the illustrated embodiment, the clutch assemblies 102, 104, 106, 108, 110 may be selectively engaged and disengaged to provide a low-forward range, a high-forward range, a low-reverse range, a high-reverse range, and an auxiliary range. In this embodiment, engagement of clutch assembly 102 provides for low range operation, while engagement of clutch assembly 104 provides for high range operation. The low and high range operation may be coupled with designation of a forward or reverse range by engagement of clutch assemblies 108, 110, respectively. Finally, an auxiliary range may be provided by engagement of clutch assemblies 104, 106. The selective engagement of the clutch assemblies 102, 104, 106, 108, 110 for each of these ranges is illustrated in FIGS. 2-6, respectively.

Figure 2:
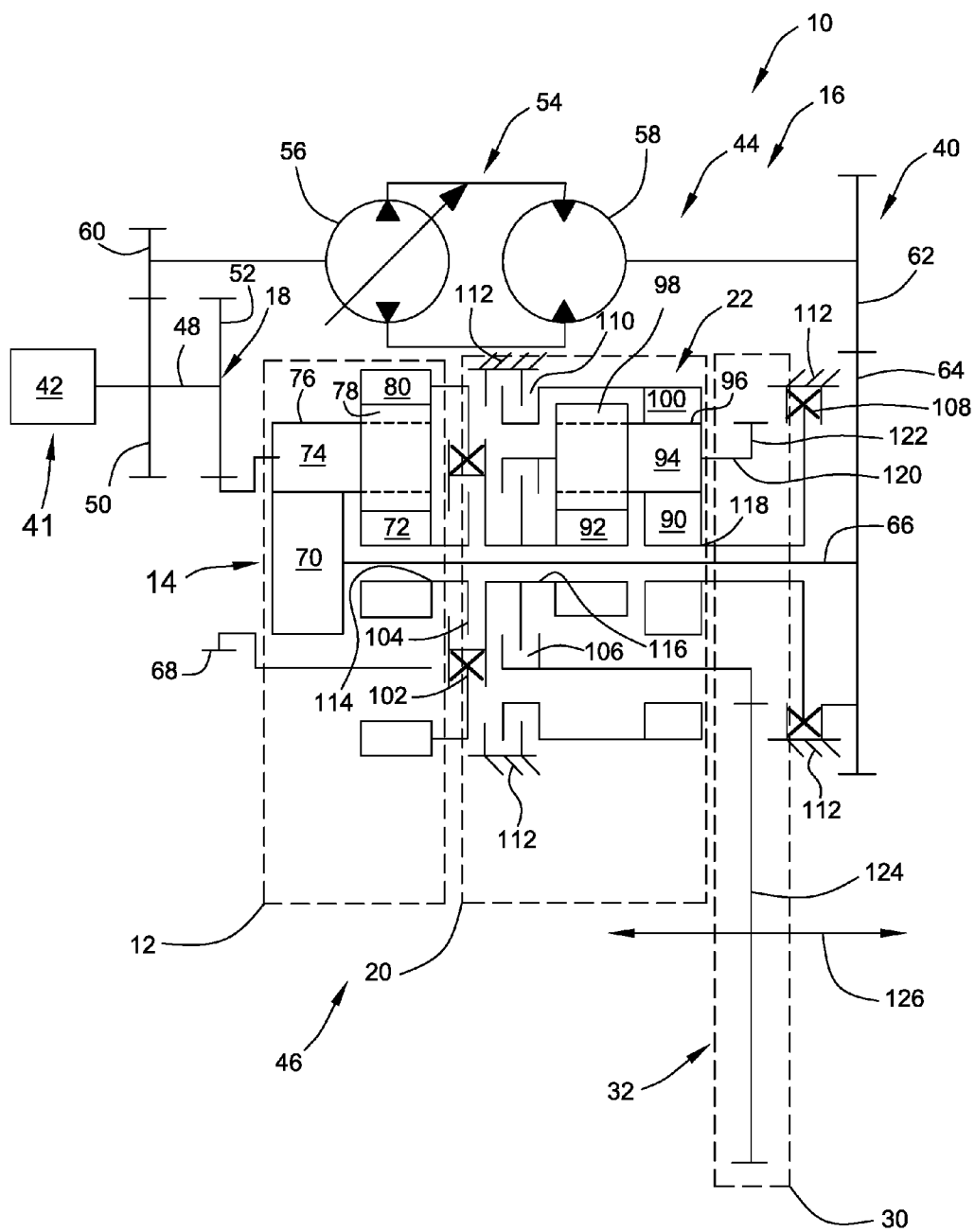
FIG. 2 illustrates the schematic view of FIG. 1 wherein the hydromechanical transmission is in low-forward gear range.

FIG. 2 illustrates the operation of the second, range module 20 to provide a low-forward range. More specifically, clutch assemblies 102, 108 are engaged to provide the low-forward operation. Accordingly, rotation of the ring gear 80 of first planetary gear arrangement 14 is transmitted by way of clutch assembly 102 and hub 116 to sun gear 92. With the engagement of clutch assembly 108, the sun gear 90 is held stationary. Power is further transmitted through the second planetary gear arrangement 22 to be output through planet carrier 94 to output member 120, from which power is transmitted through the third, drop box module 30 to final output member 126.

Figure 4:
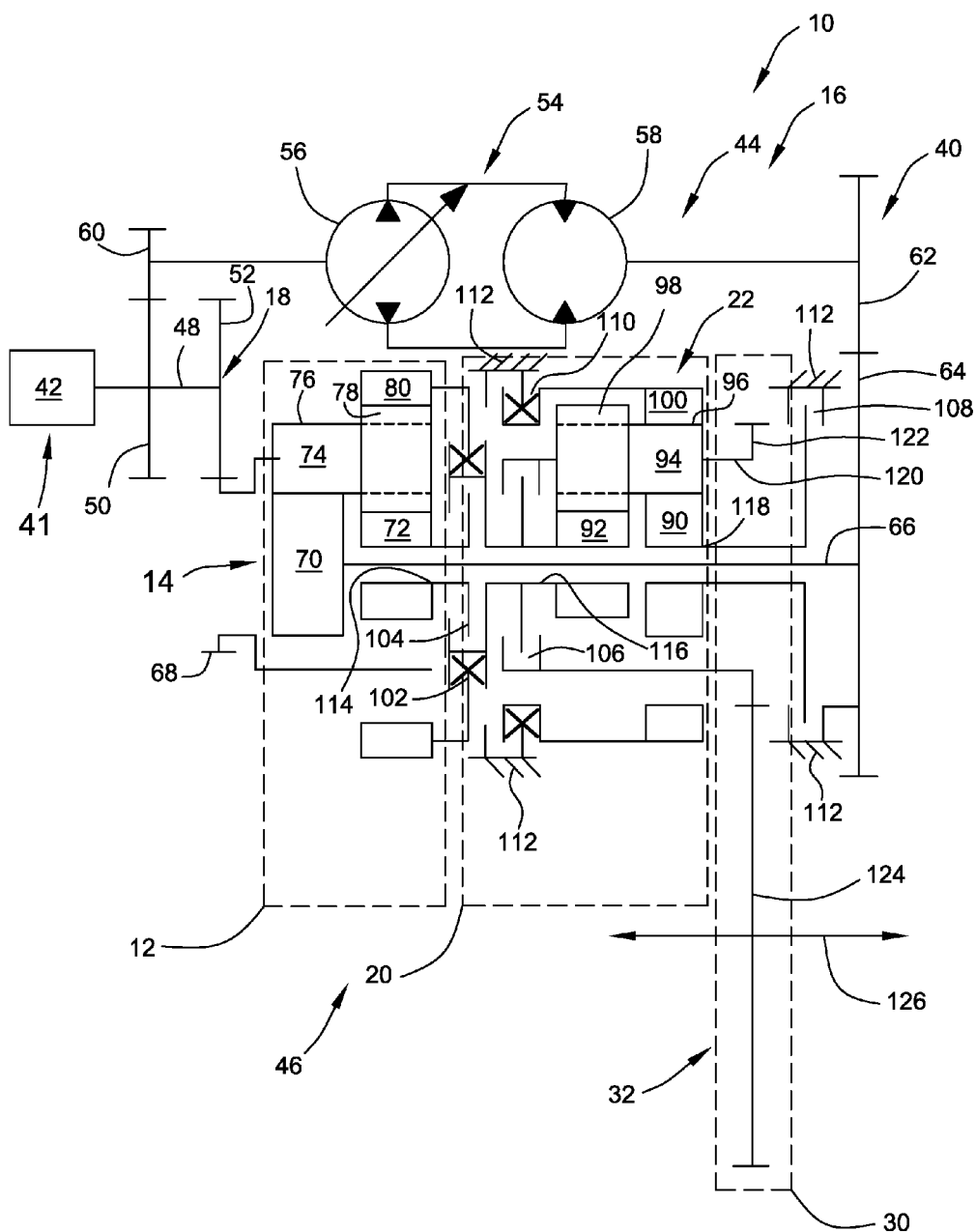
FIG. 4 illustrates the schematic view of FIG. 1 wherein the hydromechanical transmission is in low-reverse gear range.

In view of the engagement of clutch assembly 108, this low range operation is provided in the forward direction. Referring to FIG. 4, however, in operation where clutch assembly 102 is engaged and clutch assembly 110 is engaged, as opposed to clutch assembly 108, the ring gear 100 is held stationary, as opposed to the sun gear 90. As a result, the low range output to the output member 120 is provided in a reverse direction, as opposed to the forward direction illustrated in FIG. 2.

Figure 3:
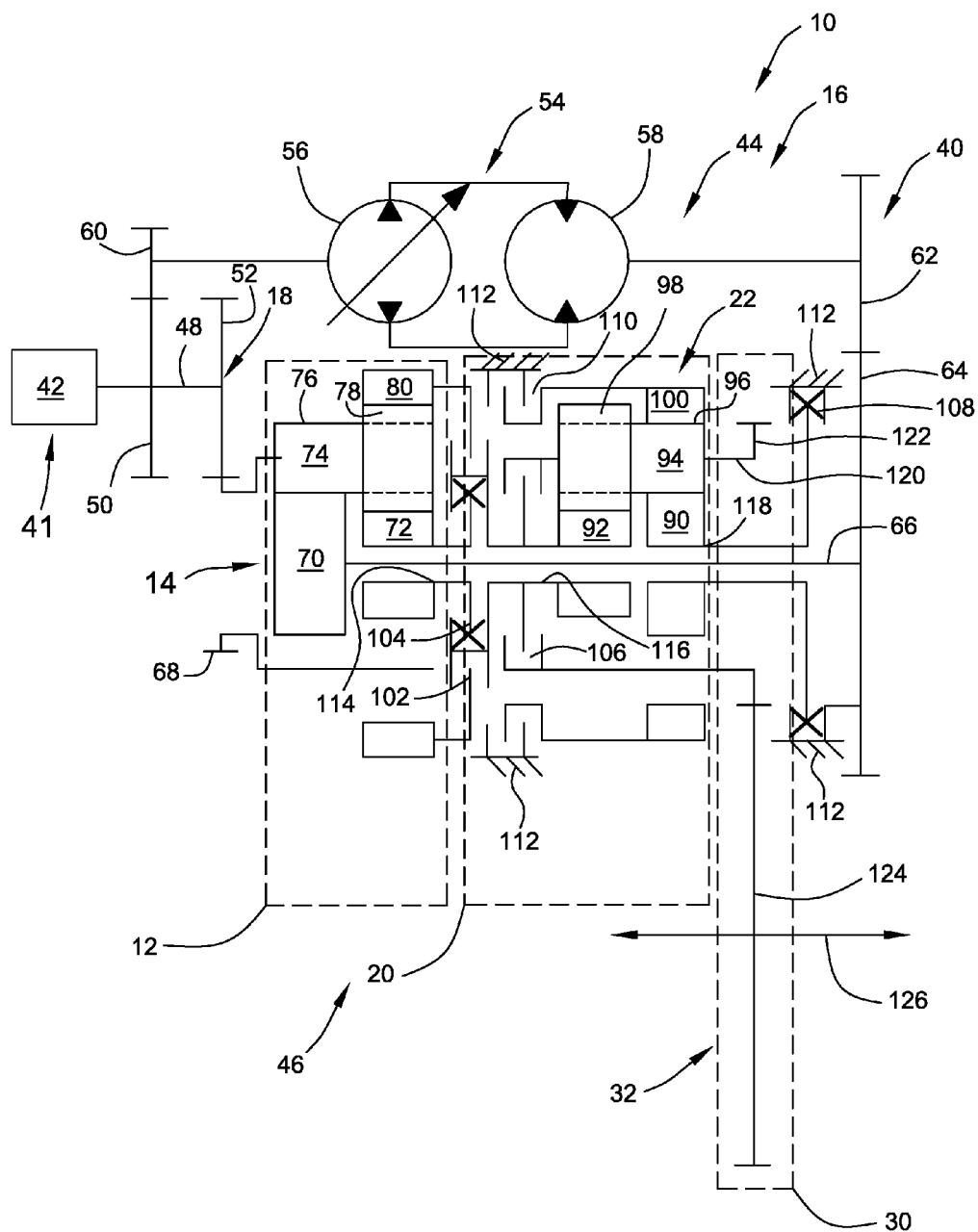
FIG. 3 illustrates the schematic view of FIG. 1 wherein the hydromechanical transmission is in high-forward gear range.

FIG. 3 illustrates the operation of the second, range module 20 to provide a high-forward range. More specifically, clutch assemblies 104, 108 are engaged to provide the high-forward operation. In other words, when clutch assembly 104 is engaged, a high range is obtained, as opposed to the low range obtained with the engagement of clutch assembly 102. Accordingly, rotation of the sun gear 72 of the first planetary gear arrangement 14 is transmitted by way of hub 114 and clutch 104 and hub 116 to sun gear 92. As explained above with regard to FIG. 2, with the engagement of clutch assembly 108, the sun gear 90 of second planetary gear arrangement 22 is held stationary. Power is further transmitted through the second planetary gear arrangement 22 to be output through planet carrier 94 to output member 120, from which power is transmitted through the third, drop box module 30 to final output member 126.

Figure 5:
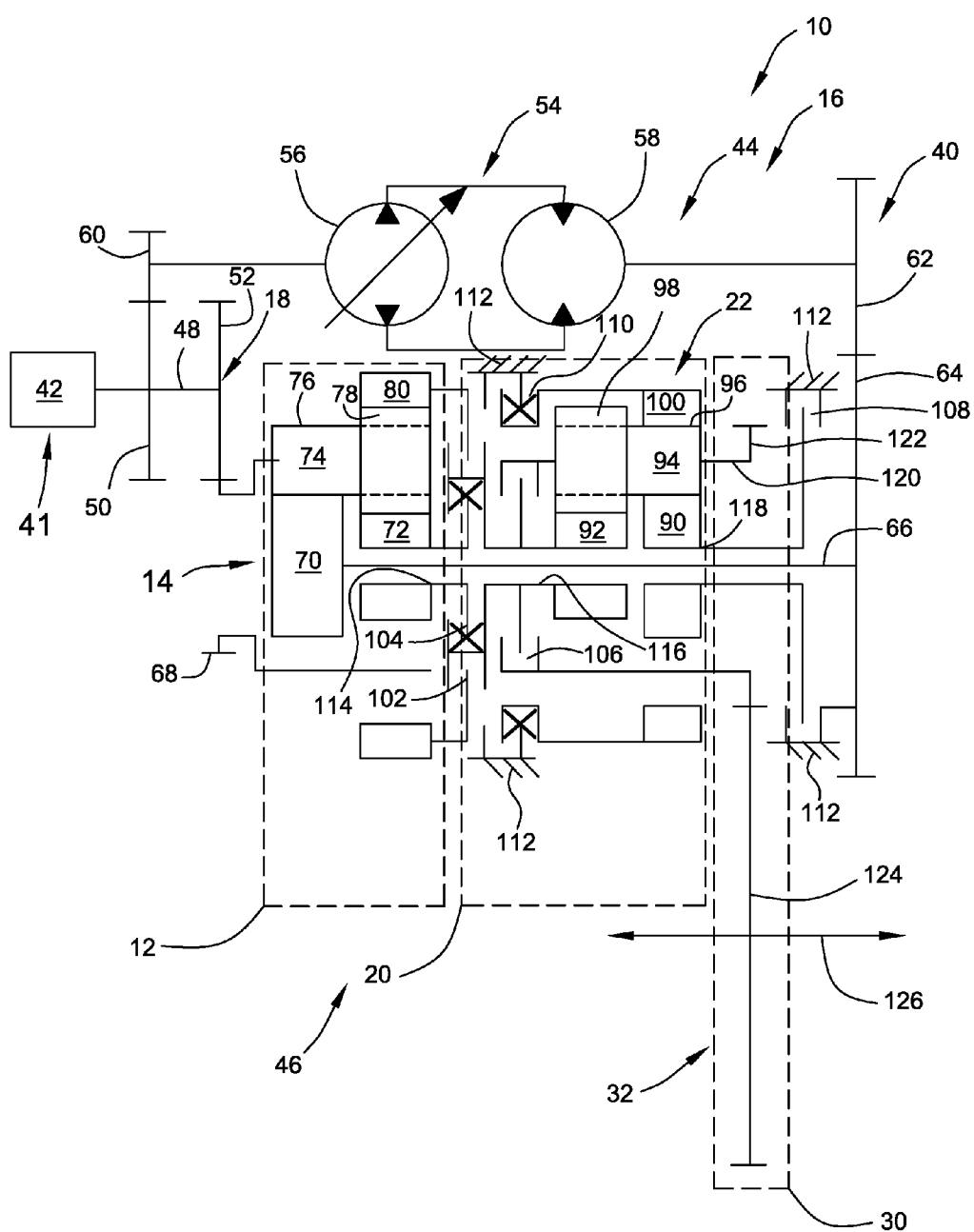
FIG. 5 illustrates the schematic view of FIG. 1 wherein the hydromechanical transmission is in high-reverse gear range.

In view of the engagement of clutch assembly 108, this high range operation is provided in the reverse direction. Referring to FIG. 5, however, in operation where clutch assembly 104 is engaged and clutch assembly 110 is engaged, as opposed to clutch assembly 108, the ring gear 100 is held stationary, as opposed to the sun gear 90. As a result, the high range output to the output member 120 is provided in a reverse direction, as opposed to the forward direction illustrated in FIG. 3.

Figure 6:
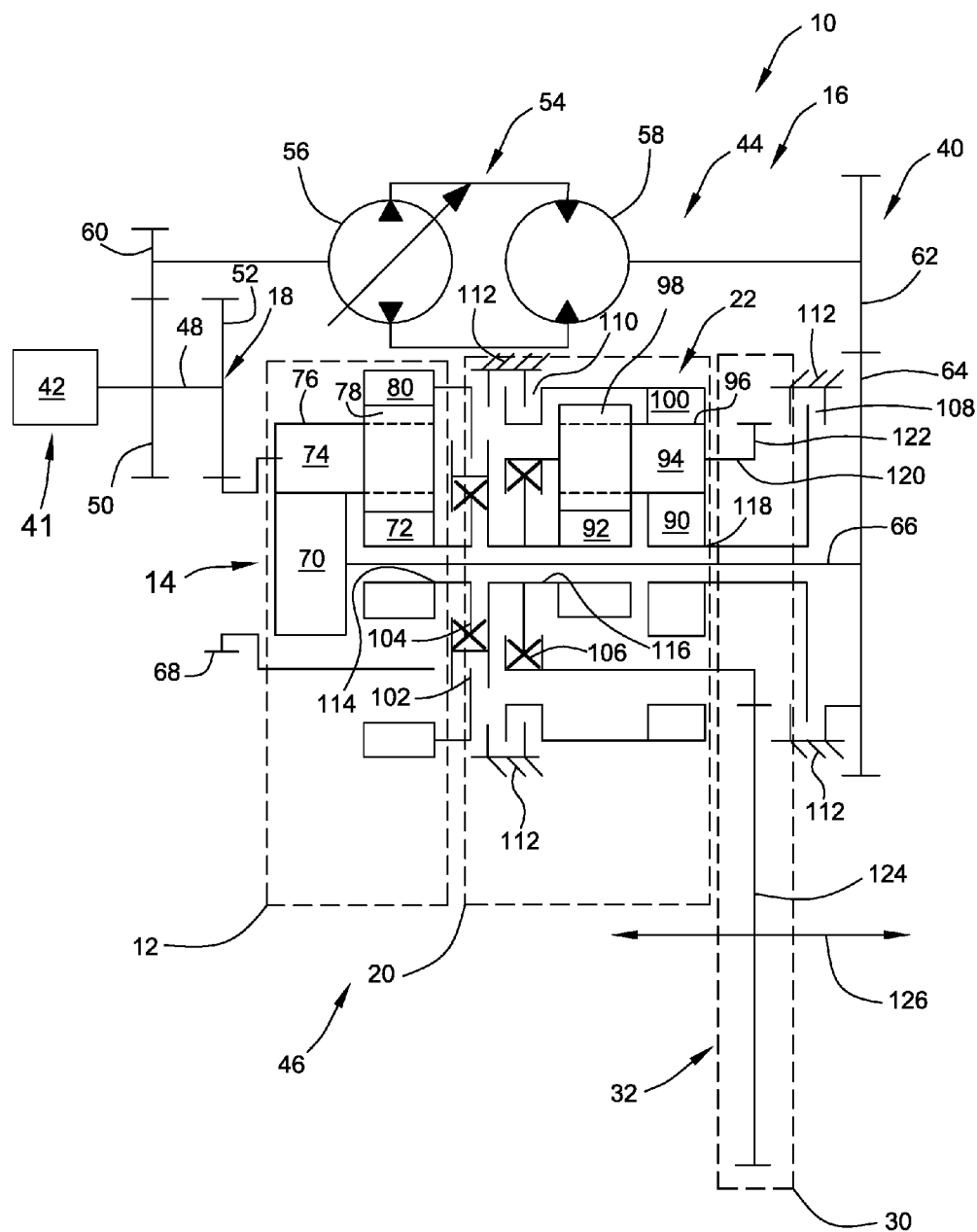
FIG. 6 illustrates the schematic view of FIG. 1 wherein the hydromechanical transmission is in an auxiliary gear range.

The second, range module 20 may additionally provide an auxiliary range to the output member 120. Referring to FIG. 6, in the auxiliary range, clutch members 104, 106 are engaged. As a result, power from the first, differential module 12 is transmitted by way of sun gear 72, to hub 114 and hub 116 to sun gear 92. In view of the engagement of clutch assembly 106, however, this rotation is likewise transmitted to planet carrier 94, which is output to output member 120 to the third, drop box module 30, which transmits rotation to the final output member 126.

Inasmuch as the first, differential module 12 provides motion to transmission, and the second, range module 20 determines the range, the transmission 10 may not require synchronizers, which are susceptible to damage during the synchronization process if the relative speed at the start of the synchronization process is too great.

Further, because the first, differential module 12 provides motion to transmission, the second, range module 20 determines the range, and the third, drop box module 30 couples the transmission 10 to a final output member 126, standardized modules 12, 20 may be utilized for a plurality of applications by including a third, drop box module 30 that tailored to the particular application.

The present disclosure is applicable to continuously variable transmissions utilizing first and second power source paths 16, 18 to provide multiple outputs through a planetary gear arrangement and a final output member 126. For example, the disclosure is applicable to hydromechanical transmissions, and transmissions utilizing a hydrostatic transmission or alternate arrangement as the first power source path, such as, for example, an electric motor driving an electro-mechanical transmission (not shown), an electric battery and a motor (not shown), a hydraulic accumulator and a motor (not shown), an electric generator and electric motor (not shown), or other device capable of providing input power.

The disclosed method may result in less wear and tear on the components, possibly resulting in a longer lifespan.

The disclosed modular transmission may provide more compact packaging, allowing the transmission to be packaged in smaller machines or locations with space limitations. Some embodiments of the hydromechanical continuously variable transmission design have a first, differential module and a second, range module, each having planetary gear trains compactly mounted in series with the output transfer gear of a third, drop box module for selectively associating the output shaft of the drivetrain to the outputs of the planetary gear trains. The disclosed modular transmission may be packaged into different machine applications through varying the design of the third, drop box module, providing flexibility in the use of the first, differential module and second, range module. Various designs of the third, drop box module, as well as the number of clutch assemblies and their configuration are envisioned. In some embodiments, a respective clutch assembly may be provided for each of the ranges of high, low, forward, and reverse. In some embodiments, a clutch assembly may be provided for an auxiliary range.

Some embodiments may provide a compact, robust transmission arrangement that is scalable to high powers. In some embodiments, the placement of one or more of the clutch assemblies between the planetary gear arrangements may allow for compact packaging.

Some embodiments may deliver a desirable valance between two or more of cost, weight, fuel efficiency, quality, durability, and reliability.

It will be appreciated that the foregoing description provides examples of the disclosed system and technique. However, it is contemplated that other implementations of the disclosure may differ in detail from the foregoing examples. The use of modifiers such as first, second and third are provided merely for convenience and are not intended to indicate any requirement that all such elements be provided or that they be provided in a specific order. By way of example only, the inclusion of a "first," a "second," and a "third" of any element is not intended to indicate that a "first" such element be provided if a "second" and a "third" such element are provided.

All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A transmission for coupling to hydromechanical power source having a first power source path including a variator and a second power source path including at least one mechanical gear, the transmission comprising:
    a differential module including at least one first planetary gear arrangement having a plurality of gears including a sun gear and a carrier,
        the first power source path providing power to the sun gear of the differential module and the second power source path providing power to the carrier of the differential module,
    a range module including at least one second planetary gear arrangement having a plurality of gears,
    a plurality of selectively engagable clutch assemblies,
        the plurality of selectively engagable clutch assemblies being selectively engagable to provide a plurality of directional ranges,
        the plurality of selectively engagable clutch assemblies including at least five clutch assemblies,
        at least a first clutch assembly, of the plurality of selectively engagable clutch assemblies, being selectively engagable to couple at least one gear from the first planetary gear arrangement of the differential module with at least one gear from the second planetary gear arrangement, at least a second clutch assembly, of the plurality of selectively engagable clutch assemblies, being selectively engagable to couple with at least one gear from the second planetary gear arrangement, and a drop box module, the drop box module including a final output member, the differential module being coupleable to the range module to provide a variable rotational power to the range module, the range module being coupleable to the drop box module to direct the variable rotational power in a selected direction, the variable rotational power, provided in the selected direction, being transmitted through the drop box module to the final output member.

2. The transmission according to claim 1, wherein the at least one first planetary gear arrangement includes a plurality of sun gears and a plurality of sets of planet gears.

3. The transmission according to claim 1, wherein the at least one second planetary gear arrangement includes a plurality of sun gears and a plurality of sets of planet gears.

4. The transmission according to claim 1 wherein the differential module in conjunction with selective engagement of the at least one first clutch assembly provides a torque/speed reduction from input from the first and second power source paths in at least one of a high and a low range to a gear of the at least one second planetary gear arrangement.

5. The transmission according to claim 1 wherein engagement of the at least one first clutch assembly provides a high gear range.

6. The transmission according to claim 1 wherein engagement of the at least one first clutch assembly provides a low gear range.

7. The transmission according to claim 1 wherein engagement of the at least one second clutch assembly provides a forward gear range.

8. The transmission according to claim 1 wherein engagement of the at least one second clutch assembly provides a reverse gear range.

9. The transmission according to claim 1 wherein engagement of the at least one second clutch assembly provides an auxiliary gear range.

10. The transmission according to claim 1 wherein the plurality of selectively engagable clutch assemblies includes at least one brake.

11. The transmission according to claim 1 wherein the drop box module is exchangeable to provide varied output configurations.

12. A transmission for coupling to a hydromechanical power source having a first power source path including a variator and a second power source path including at least one mechanical gear, the transmission comprising:

a differential module including a first planetary gear arrangement including first and second sun gears, first and second sets of planet gears, a first planet carrier and a first ring gear, the first and second power source paths providing power to the differential module, a range module, the range module including a second planetary gear arrangement including third and fourth sun gears, third and fourth sets of planet gears, a second planet carrier, and a second ring gear, at least one of said first carrier holding said first and second sets of planet gears, and said second carrier holding said third and fourth sets of planet gears, a plurality of clutch assemblies, the plurality of clutch assemblies being selectively engagable to couple at least one of the first and second planetary gear arrangements to provide a high-forward range, a low-forward range, and at least one reverse range, and a drop box module, the drop box module including a plurality of gears providing rotational motion to a final output member, the differential module being coupleable to the range module to provide a variable rotational power to the range module, the range module being coupleable to the drop box module to direct the variable rotational power in a selected range, the variable rotational power, provided in the selected range, being transmitted through the drop box module to the final output member.

13. The transmission according to claim 12, wherein the plurality of clutch assemblies are selectively engagable to provide a low-reverse range and a high-reverse range.

14. The transmission according to claim 12, further including a plurality of hubs rotatably mounted about a connection member of the first power source path, at least one of the plurality of hubs being secured with at least one of the sun gears, and at least one of the plurality of clutch assemblies being selectively engagable to couple with at least one of the hubs.

15. The transmission according to claim 12 wherein the plurality of clutch assemblies includes at least four clutch assemblies.

16. The transmission according to claim 12 wherein the plurality of clutch assemblies includes at least five clutch assemblies.

17. A modular transmission for coupling to a primary driver, the modular transmission comprising:

a first power source path including a variator, a second power source path including at least one mechanical gear, a differential module including a first planetary gear arrangement including first and second sun gears, first and second sets of planet gears, a first planet carrier holding said first and second sets of planet gears, and a first ring gear, the first and second power source paths providing power to the differential module, a range module, the range module including a second planetary gear arrangement including third and fourth sun gears, third and fourth sets of planet gears, a second planet carrier holding said third and fourth sets of planet gears, and a second ring gear, a plurality of clutch assemblies, a first clutch assembly, of the plurality of clutch assemblies, being selectively engagable to couple at least one gear of the first planetary gear arrangement and at least one gear of the second planetary gear arrangement, a second clutch assembly, of the plurality of clutch assemblies, being selectively engagable to couple with at least one gear of the second planetary gear arrangement, selective engagement and disengagement of the plurality of clutch assemblies providing a high-forward range, a low-forward range, and at least one reverse range, and a drop box module, the drop box module including a plurality of gears providing rotational motion to a final output member, the differential module being coupleable to the range module to provide a variable rotational power to the range module, the range module being coupleable to the drop box module to direct the variable rotational power in a selected range, the variable rotational power, in the selected range, being transmitted through the drop box module to the final output member.

18. The modular transmission according to claim 17, the modular transmission including at least four clutch assemblies, the plurality of clutch assemblies being selectively engagable to provide a low-reverse range and a high-reverse range, the modular transmission further including a plurality of hubs rotatably mounted about a connection member of the first power source path, at least one of the hubs being secured with at least one of the sun gears, and at least one of the plurality of clutch assemblies being selectively engagable to couple with at least one of the hubs.

* * * * *